Patented June 10, 1941

2,245,217

UNITED STATES PATENT OFFICE 2,245,217

PRECIPITATION OF METALS FROM SOLUTIONS

Kenneth S. Mowlds, Baltimore, Md., assignor to The Glidden Company, Cleveland, Ohio, a corporation of Ohio No Drawing. Application August 2, 1940, Serial No. 350,060

27 Claims. (Cl. 75—109)

This application is a continuation-in-part of my application Ser. No. 272,147, filed May 6, 1939.

This invention relates to an improved process for precipitating and/or recovering valuable materials from hydro-metallurgical solutions and more particularly relates to an improved process for precipitating metals from a hydro-metallurgical solution containing the same by means of a powdered precipitant.

The addition of comminuted metal precipitants to metal salt solutions to effect precipitation of impurities in solution is well-known. This procedure is used, for example, in the purification of zinc sulfate solution by the addition of zinc dust or blue powder or in such processes as that disclosed in U. S. Patent No. 1,852,044. However, this process has not been particularly efficient as it has been necessary to use a large excess of the zinc dust or other precipitant to effect proper precipitation of the metals, other foreign matter and/or impurities. Various expedients have been proposed to increase the efficiency of this action. One of these expedients is continuous and vigorous agitation to keep the precipitant in suspension. However, even with the most efficient agitation a large excess of precipitant is required, the precipitant has a tendency to ball up or agglomerate, and the time required to effect the precipitation is necessarily unduly prolonged.

According to the present invention a procedure is provided whereby the efficiency of the precipitation is greatly increased. In practicing the present invention the amount of precipitant necessary is reduced to at least half, and frequently is only one-fourth or one-fifth or less of the amount required by the most efficient prior art methods. Also, the time necessary to effect precipitation is materially reduced.

I have found that the addition of a suitable wetting agent greatly increases the efficiency of the precipitation. Preferably, the zinc dust or other precipitant is treated with the wetting agent in an aqueous solution or slurry, or in any other suitable manner, and is then added to the hydrometallurgical solution.

In the purification of zinc sulfate solution, for example, for the manufacture of lithopone, it is customary to add zinc dust to the zinc sulfate solution to precipitate copper, cadmium, nickel and other metal impurities, and it is particularly important that these impurities be removed as they cause the production of muddy and dirty color in the lithopone. While heretofore it required from 125 to 200 pounds of zinc dust and from two to three hours treatment to effect the desired precipitation of a given amount of a particular zinc sulfate solution, only 30 pounds of zinc dust are sufficient when treating the zinc dust with a wetting agent, and the time may be reduced to less than half an hour.

When the zinc dust treated with the wetting agent is added to a solution, instead of coagulating, as is usually the case, it spreads out rapidly, is easily wetted and mixed in the solution, in which it is much more permanently and uniformly dispersed than in a solution free from wetting agent. It is believed that the results are due to the fact that the zinc dust is dispersed in very fine particles throughout the solution, instead of in the form of agglomerates and that thereby a greater surface of the zinc dust is provided for reaction. Whatever the action, however, the invention provides a simple and easy method of overcoming the difficulties incident to the present methods, and results in a marked saving in the amount of precipitant required and in the time consumed in effecting the precipitation.

Among the wetting agents for the comminuted metallic precipitants which have been found suitable for my purpose and which are not coagulated by the hydro-metallurgical solutions that are treated according to my invention are sulfonated mineral oils, the sodium, potassium and ammonium sulfonates of the anthracene group, the sodium salt of alkyl naphthalene sulfonic acid sold under the trade name Aerosol OS, alkyl naphthalene potassium sulfonate, water soluble esters of a sulfonated bicarboxylic acid and the salts of sulfated high molecular weight alcohols, such as lauryl sodium sulfate. The following specific examples are illustrative of the method of practicing my invention.

*Example I*

To 30,000 liters of a 30° Baumé zinc sulfate solution at 150° F. (containing approximately 18,000 pounds of $ZnSO_4$) is added, with the usual agitation, 50 pounds of zinc dust, which has been treated with sufficient sulfonated mineral oil to coat the particles. The zinc dust is spread out and dispersed in the solution without the usual agglomeration and coagulation. The agitation is continued for 45 minutes when the precipitation is complete.

The results obtained are equal to those derived when 200 pounds of the untreated zinc dust was added to an equal amount of the same zinc sulfate solution and the same agitation continued for two hours.

Example II

To 30,000 liters of a 30° Baumé zinc sulfate solution at 150° F. (containing approximately 18,000 pounds of ZnSO₄) is added, with the usual agitation, 50 pounds of zinc dust, which has been treated with sufficient sodium sulfonate of the anthracene group to coat the particles. The zinc dust is spread out and dispersed in the solution without the usual agglomeration and coagulation. The agitation is continued for 45 minutes when the precipitation is complete.

Example III

To 30,000 liters of a 30° Baumé zinc sulfate solution at 150° F. (containing approximately 18,000 pounds of ZnSO₄) is added, with the usual agitation, 50 pounds of zinc dust, which has been treated with sufficient sodium salt of alkyl naphthalene sulfonic acid to coat the particles. The zinc dust is spread out and dispersed in the solution without the usual agglomeration and coagulation. The agitation is continued for 45 minutes when the precipitation is complete.

Example IV

To 30,000 liters of a 30° Baumé zinc sulfate solution at 150° F. (containing approximately 18,000 pounds of ZnSO₄) is added, with the usual agitation, 50 pounds of zinc dust, which has been treated with sufficient amount of a salt of a sulfated high molecular weight alcohol to coat the particles. The zinc dust is spread out and dispersed in the solution without the usual agglomeration and coagulation. The agitation is continued for 45 minutes when the precipitation is complete.

Example V

To 30,000 liters of a 30° Baumé zinc sulfate solution at 150° F. (containing approximately 18,000 pounds of ZnSO₄) is added, with the usual agitation, 50 pounds of zinc dust, which has been treated with sufficient alkyl naphthalene potassium sulfonate to coat the particles. The zinc dust is spread out and dispersed in the solution without the usual agglomeration and coagulation. The agitation is continued for 45 minutes when the precipitation is complete.

Example VI

To 30,000 liters of a 30° Baumé zinc sulfate solution at 150° F. (containing approximately 18,000 pounds of ZnSO₄) is added, with the usual agitation, 50 pounds of zinc dust, which has been treated with sufficient lauryl sodium sulfate to coat the particles. The zinc dust is spread out and dispersed in the solution without the usual agglomeration and coagulation. The agitation is continued for 45 minutes when the precipitation is complete.

Example VII

To 1,000 liters of an aqueous CuSO₄ solution containing 350 pounds CuSO₄ is added, with the usual agitation, 60 pounds of iron dust which has been treated with sufficient sulfonated mineral oil to coat the particles. The iron dust is spread out and dispersed in the solution without the usual agglomeration and coagulation. The agitation is continued for 45 minutes when the precipitation is complete.

Example VIII

To 1,000 liters of an aqueous CuSO₄ solution containing 350 pounds CuSO₄ is added, with the usual agitation, 60 pounds of iron dust which has been treated with sufficient sodium sulfonate of the anthracene group to coat the particles. The iron dust is spread out and dispersed in the solution without the usual agglomeration and coagulation. This agitation is continued for 45 minutes when the precipitation is complete.

Example IX

To 1,000 liters of an aqueous solution containing 500 pounds ZnSO₄ and 100 pounds CuSO₄ is added, with the usual agitation, 20 pounds of iron dust which has been treated with sufficient sodium sulfonate of the anthracene group to coat the particles. The iron dust is spread out and dispersed in the solution without the usual agglomeration and coagulation. The agitation is continued for 45 minutes when the precipitation is complete.

It is to be understood that my invention may be applied to other solutions and other precipitants, and may be used for the recovery of the desired metals from solution as well as for the purification of solutions containing undesired impurities, as in Example IX, wherein the ZnSO₄ solution is freed of copper.

I prefer to treat the powder or comminuted metal serving as the precipitant with the wetting agent before adding said precipitant to the hydro-metallurgical solution. However, beneficial results of my invention are also obtained by adding the wetting agent after the comminuted material has been introduced into the hydro-metallurgical solution.

The wetting agent employed must not be coagulated by the hydro-metallurgical solution. For best results, the amount of wetting agent should be sufficient to coat the particles of the precipitant. By having the wetting agent equal in weight to 0.1 to 0.3% of the weight of the zinc dust or other comminuted metal precipitant the most satisfactory range is provided for normal conditions of operation. However, beneficial results may be obtained through the practice of my invention when the weight of the wetting agent varies from 0.02 to 5% of the weight of the zinc dust or other comminuted metal precipitant. The weight of zinc dust or other comminuted metal precipitant employed in my invention may vary from 0.3 to 6% of the weight of the zinc sulfate or other salt dissolved in the hydro-metallurgical solution, depending on the amount of impurities present in the hydro-metallurgical solution.

The concentration of hydro-metallurgical solution employed in my process may vary from 15° Baumé (specific gravity 1.1154) to 45° Baumé (specific gravity 1.45). I have found that greater benefits are derived from the wetting agent with the stronger concentrations of hydro-metallurgical solutions, both from the standpoint of lesser amount of zinc dust or other comminuted metal precipitant required and consumed in the process and of efficiency of removal of impurities.

My invention is considered broadly to reside in the employment of a water soluble wetting agent for the comminuted precipitant used to effect precipitation of the metal or metals from solution, said wetting agent being uncoagulated by said solution.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. The process of precipitating metals from hydro-metallurgical solutions which comprises adding to the hydro-metallic solution a comminuted metallic precipitant for the metal it is desired to precipitate and a water soluble wetting agent for the precipitant which is not coagulated by said hydro-metallurgical solutions, and precipitating the desired metal.

2. The process of precipitating metals from hydro-metallurgical solutions which comprises treating a comminuted metal precipitant for the metal it is desired to precipitate with a water soluble wetting agent for the precipitant which is not coagulated by said hydro-metallurgical solutions, adding the thus treated precipitant to the hydro-metallic solution, and precipitating the desired metal.

3. The method of purifying a zinc sulfate solution containing metallic impurities comprising adding to the zinc sulfate solution zinc dust together with a water soluble wetting agent therefor which is not coagulated by said zinc sulfate solution, and precipitating metallic impurities.

4. The method of precipitating metals from hydro-metallurgical solutions which comprises adding a comminuted metal precipitant for the metal it is desired to precipitate together with a sulfonated mineral oil to the solution, and precipitating the desired metal.

5. The method of purifying a zinc sulfate solution containing metallic impurities which comprises adding zinc dust and a sulfonated mineral oil to the zinc sulfate solution, and precipitating metallic impurities.

6. The method of purifying a zinc sulfate solution containing metallic impurities which comprises treating zinc dust with a wetting agent therefor which is not coagulated by said zinc sulfate solution, adding the so-treated zinc dust to the zinc sulfate solution, and precipitating metallic impurities.

7. In the method of precipitating metals from a hydro-metallurgical solution by means of a comminuted metallic precipitant, the improvement comprising dispersing the comminuted precipitant in the solution by means including a water soluble wetting agent for the precipitant which is not coagulated by said hydro-metallurgical solution.

8. In the method of treating a solution with a comminuted metallic precipitant for substances in said solution, the improvement which comprises dispersing the comminuted precipitant in the solution by means including a water soluble wetting agent for the precipitant which is not coagulated by said solution.

9. The method of treating comminuted precipitants for use in precipitating metals from hydro-metallurgical solutions which comprises treating the comminuted precipitant with a water soluble wetting agent for the precipitant which is not coagulated by said hydro-metallurgical solutions.

10. The method of treating comminuted metal precipitants for use in precipitating metals from hydro-metallurgical solutions which comprises treating the comminuted metal with a water soluble wetting agent for the comminuted metal which is not coagulated by said hydro-metallurgical solutions.

11. The method of treating comminuted zinc for use in the precipitation of metals from hydro-metallurgical solutions which comprises treating the comminuted zinc with a water soluble wetting agent therefor which is not coagulated by said hydro-metallurgical solutions.

12. The method of treating comminuted metal precipitants for use in precipitating metals from hydro-metallurgical solutions which comprises treating the comminuted metal with a sulfonated mineral oil.

13. A precipitant for metals from hydro-metallurgical solutions comprising a comminuted precipitant for the metals it is desired to precipitate and a water soluble wetting agent for the precipitant which is not coagulated by said hydro-metallurgical solutions.

14. A precipitant for metals from hydro-metallurgical solutions comprising a comminuted metal precipitant for the metals it is desired to precipitate and a water soluble wetting agent for the comminuted metal which is not coagulated by said hydro-metallurgical solutions.

15. A composition of matter suitable for use in precipitating metals from hydro-metallurgical solutions comprising a comminuted metal precipitant for the metals it is desired to precipitate and a sulfonated mineral oil wetting agent for the comminuted metal.

16. A composition of matter comprising comminuted zinc and a water soluble wetting agent therefor which is not coagulated by an aqueous solution of zinc sulfate.

17. A composition of matter comprising iron powder and a water soluble wetting agent therefor which is not coagulated by an aqueous solution of copper sulfate.

18. The method of precipitating copper from copper salt solutions, such as a copper sulfate solution, which comprises adding to said solution iron powder and a water soluble wetting agent for the iron powder which is not coagulated by an aqueous solution of copper sulfate.

19. A composition of matter comprising iron powder and a water soluble wetting agent therefor which is not coagulated by an aqueous solution of copper sulfate and zinc sulfate.

20. A composition of matter comprising iron powder and a water soluble wetting agent therefor consisting of a sulfonate of the anthracene group having as a base a member of the alkali metal group.

21. The method of precipitating copper from an aqueous solution of a copper salt and a zinc salt which comprises adding to said solution iron powder and a water soluble wetting agent for the iron powder which is not coagulated by said solution of copper salt and zinc salt.

22. The method of precipitating copper from an aqueous solution of a copper salt and a zinc salt which comprises adding to said solution iron powder and a water soluble wetting agent for the iron powder which is not coagulated by said aqueous solution of copper sulfate and zinc sulfate.

23. The method of precipitating metals from hydro-metallurgical solutions which comprises adding to the solution a comminuted metal precipitant for the metal it is desired to precipitate together with a sulfonate of the anthracene group having as a base a member of the alkali metal group, and precipitating the desired metal.

24. The method of purifying a zinc sulfate solution containing metallic impurities which comprises adding to the zinc sulfate solution zinc dust and a sulfonate of the anthracene group having as a base a member of the alkali metal group, and precipitating metallic impurities.

25. The method of treating comminuted metal precipitants for use in precipitating metals from hydro-metallurgical solutions which comprises treating the comminuted metal with a sulfonate of the anthracene group having as a base a member of the alkali metal group.

26. A composition of matter suitable for use in precipitating metals from hydro-metallurgical solutions comprising a comminuted metal precipitant for the metals it is desired to precipitate and a wetting agent for the comminuted metal consisting of a sulfonate of the anthracene group having as a base a member of the alkali metal group.

27. A composition of matter comprising comminuted zinc and a water soluble wetting agent therefor consisting of a sulfonate of the anthracene group having as a base a member of the alkali metal group.

KENNETH S. MOWLDS.